US008210991B2

(12) United States Patent
Yuet et al.

(10) Patent No.: US 8,210,991 B2
(45) Date of Patent: Jul. 3, 2012

(54) AUTOMATED MACHINE RETARDING SYSTEMS AND METHODS

(75) Inventors: Fu Pei Yuet, Peoria, IL (US); Jamie Shults, Sahuarita, AZ (US); Jean-Jacques Clar, Dunlap, IL (US); Kenneth L. Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 915 days.

(21) Appl. No.: 12/213,769

(22) Filed: Jun. 24, 2008

(65) Prior Publication Data
US 2009/0318263 A1 Dec. 24, 2009

(51) Int. Cl.
- B60W 10/04 (2006.01)
- B60W 10/18 (2012.01)
- B60K 31/00 (2006.01)
- B60K 31/18 (2006.01)
- B60T 7/12 (2006.01)
- B60T 8/32 (2006.01)

(52) U.S. Cl. .......... 477/182; 180/170; 180/171; 701/82; 701/83; 303/191

(58) Field of Classification Search .................. 477/182; 180/170, 171; 701/66, 70, 82, 83; 303/191, 303/192
See application file for complete search history.

(56) References Cited

U.S. PATENT DOCUMENTS

| | | | |
|---|---|---|---|
| 1,906,571 A | 5/1933 | Gilmore | |
| 3,245,502 A | 4/1966 | Randol | |
| 4,262,783 A * | 4/1981 | Scarrott et al. | 477/94 |
| 4,355,607 A * | 10/1982 | Blaney | 123/350 |
| 4,884,669 A * | 12/1989 | Ehrlinger | 192/216 |
| 4,945,484 A * | 7/1990 | Cote et al. | 701/63 |
| 5,375,821 A | 12/1994 | Toshimitsu et al. | |
| 5,587,905 A | 12/1996 | Yesel et al. | |
| 5,685,619 A * | 11/1997 | Brown | 303/145 |
| 6,011,823 A | 1/2000 | Bleiweiss et al. | |
| 6,223,592 B1 | 5/2001 | Genise | |
| 6,240,356 B1 | 5/2001 | Lapke | |
| 6,249,733 B1 * | 6/2001 | Smith | 701/50 |
| 6,299,263 B1 | 10/2001 | Uematsu et al. | |
| 6,389,253 B1 | 5/2002 | Nonomura et al. | |
| 6,819,995 B2 | 11/2004 | Bellinger | |
| 7,159,554 B2 | 1/2007 | Catalano | |
| 7,184,864 B2 | 2/2007 | Bale et al. | |
| 7,401,872 B2 * | 7/2008 | Kinder et al. | 303/191 |
| 7,835,840 B2 * | 11/2010 | Chiu et al. | 701/51 |
| 2005/0065693 A1 | 3/2005 | Wang et al. | |
| 2005/0253022 A1 | 11/2005 | Peltz et al. | |
| 2006/0069488 A1 | 3/2006 | Sychra et al. | |
| 2006/0122759 A1 * | 6/2006 | Leyten et al. | 701/70 |
| 2008/0242502 A1 * | 10/2008 | Lin | 477/80 |

* cited by examiner

*Primary Examiner* — Tisha Lewis
(74) *Attorney, Agent, or Firm* — Finnegan, Henderson, Farabow, Garrett & Dunner LLP

(57) ABSTRACT

A control system for a machine is disclosed. The control system may have a first sensor configured to generate a first signal indicative of an inclination of the machine, a second sensor configured to generate a second signal indicative of a travel speed of the machine, a third sensor configured to generate a third signal indicative of an engine speed of the machine, and a controller disposed in communication with each of the first, second, and third sensors. The controller is configured to determine whether the machine is freewheeling in a neutral gear, and to generate a machine braking command based on at least one of the first, second, and third signals. A method of retarding a machine is also disclosed.

10 Claims, 4 Drawing Sheets

AUTOMATED MACHINE RETARDING SYSTEMS AND METHODS

TECHNICAL FIELD

The present disclosure relates generally to a machine retarding, and, more particularly, to an automated machine retarding system and method for use with remotely and autonomously controlled machines.

BACKGROUND

Industrial machines, such as dozers, motor graders, wheel loaders, and other types of heavy equipment are used to perform a variety of tasks. The completion of some of these tasks requires operation of the machines on or near steep inclines that have the potential to cause engine and machine damage. For example, when operated on a steep incline, a machine may be instructed to enter a gear that is inappropriate for the particular incline. As a result, the machine may be able to move too quickly, or the engine may be driven to rotate at a speed above a damage threshold. When the machine is being controlled by an on-board human operator, these engine and machine conditions can be anticipated by the operator and manually avoided.

In some situations, such as during remote or autonomous control of a machine, it may not be possible for a human operator to sufficiently anticipate the effects of worksite conditions on operation of the engine or machine. For example, the operator may be unable to hear the engine, sense the pitch of the machine, or feel accelerations indicative of machine operation relative to engine, transmission, and/or worksite conditions. In addition, a remote operator may be more prone to directing the machine to travel into areas of the worksite, such as voids in a coal pile or across steep inclines, that should not be traversed above a certain speed or transmission gear.

Moreover, the remote operator may be unable to predict or avoid engine over-speed conditions and detrimental gear changes. For example, a remote operator could instruct a machine operating at the top end of its second gear to switch into its first gear, thereby over-speeding, or "over-revving" the engine. The remote operator could also cause gear changes that jeopardize the entire machine. For example, if the remote operator instructs a machine operating in its first gear down a steep incline, to switch into its second gear, the machine may accelerate too quickly. Accordingly, there is a need for an automated machine retarding system and method.

An automated machine retarder system is described in U.S. Pat. No. 6,299,263 (the '263 patent) issued to Uematsu, et al. on Oct. 9, 2001. The automated retarder system of the '263 patent controls the speed of a mine vehicle as it descends a slope. The retarder system includes a controller in communication with a plurality of detectors, such as a vehicle speed detector; an actuator, such as a braking mechanism; an operator display unit; and a manual input switch. The controller operates the braking mechanism based on parameters received from the detectors, such as the inclination of the vehicle, the oil temperature, the current gear, the operator inputs, and the vehicle speed, so as to prevent brake overheating and to maintain the vehicle at a constant hill descent speed.

Although the system of the '263 patent may help minimize the likelihood of brake overheating and related vehicle freewheeling on a steep slope, it may not be able to completely stop a vehicle. Therefore, it may be ineffective in preventing vehicle freewheeling occurring as a result of being inadvertently left on a slope in a neutral condition. Likewise, the system of the '263 patent may be unable to prevent engine overspeed conditions and detrimental gear changes occurring in a vehicle that is being remotely-operated on a slope. That is, even though the system of the '263 patent may take into consideration various parameters for controlling vehicle descent speed, the system only uses the parameters so as to maintain a descent speed slow enough to prevent the brakes from overheating. As a result, the system of the '263 patent may be ineffective for preventing other causes of damage to the engine and machine.

The disclosed system is directed to overcoming one or more of the problems set forth above.

SUMMARY

In one aspect, the present disclosure is directed to a control system for a machine. The control system may include a first sensor configured to generate a first signal indicative of an inclination of the machine, a second sensor configured to generate a second signal indicative of a travel speed of the machine, a third sensor configured to generate a third signal indicative of an engine speed of the machine, and a controller disposed in communication with each of the first, second, and third sensors. The controller is configured to determine whether the machine is freewheeling in a neutral gear, and to generate a machine braking command based on at least one of the first, second, and third signals.

In another aspect, the present disclosure is directed to a method of retarding a machine. The method may include detecting an inclination of the machine, detecting a travel speed of the machine, and detecting an engine speed of the machine. The method may further include determining whether the machine is freewheeling in a neutral gear, and implementing machine braking when the machine is freewheeling in the neutral gear, based on at least one of the inclination, travel speed, and engine speed.

In yet another aspect, the present disclosure is directed to a machine. The machine includes a power source; a traction device driven by the power source to propel the machine; a first sensor configured to detect an inclination of the machine; a second sensor configured to detect a travel speed of the machine; a third sensor configured to detect an engine speed of the machine; and a controller disposed in communication with each of the first, second, and third sensors, wherein the controller is configured to determine whether the machine is freewheeling in a neutral gear, and to generate a machine braking command based on at least one of the first, second, and third signals.

DETAILED DESCRIPTION

Figure 1:
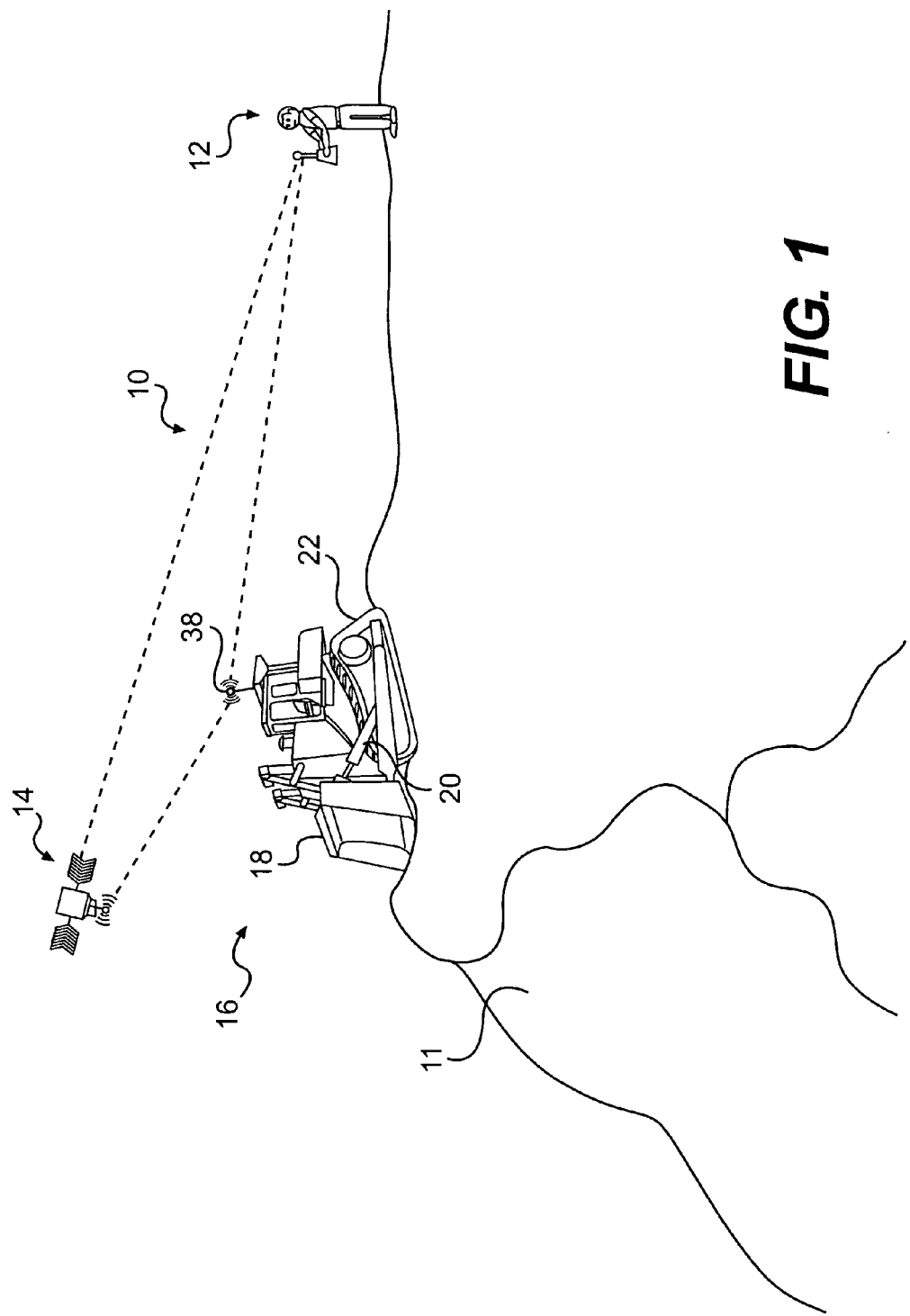
FIG. 1 is a pictorial illustration of an exemplary disclosed machine operating at a worksite.

FIG. 1 illustrates a worksite 10 with an exemplary machine 16 performing a predetermined task. Worksite 10 may include, for example, a mine site, a landfill, a quarry, a construction site, or any other type of worksite known in the art.

The predetermined task may be associated with altering the current geography at worksite 10. For example, the predetermined task may include a grading operation, a leveling operation, a bulk material removal operation, or any other type of operation that results in alteration of the current geography at worksite 10.

In one embodiment, machine 16 may embody a mobile machine that performs some type of operation associated with an industry, such as mining, construction, farming, or any other industry known in the art. For example, machine 16 may embody an earth moving machine such as a dozer having a blade or other work implement 18 movable by way of one or more motors or cylinders 20. Machine 16 may also include one more traction devices 22, which may function to steer and/or propel machine 16 around worksite 10.

As illustrated in FIG. 1, machine 16 may be in wireless communication with a remote operator 12 and/or another remote controller via a satellite 14, by way of an antenna 38. Therefore, the operation of machine 16 may be monitored and manipulated via remote operator 12 and/or another remote station via satellite 14 as it moves around worksite 10. In some cases, worksite 10 may have a particular geographical feature, such as a slope 11, which may jeopardize the effectiveness of the control exerted via remote operator 12 or satellite 14. For example, control instructions from remote operator 12 and satellite 14 may not take into account the effects of slope 11 on the operation of machine 16. Accordingly, machine 16 may be provided with a control system configured to compensate for deficiencies of remote and autonomous machine control.

Figure 2:
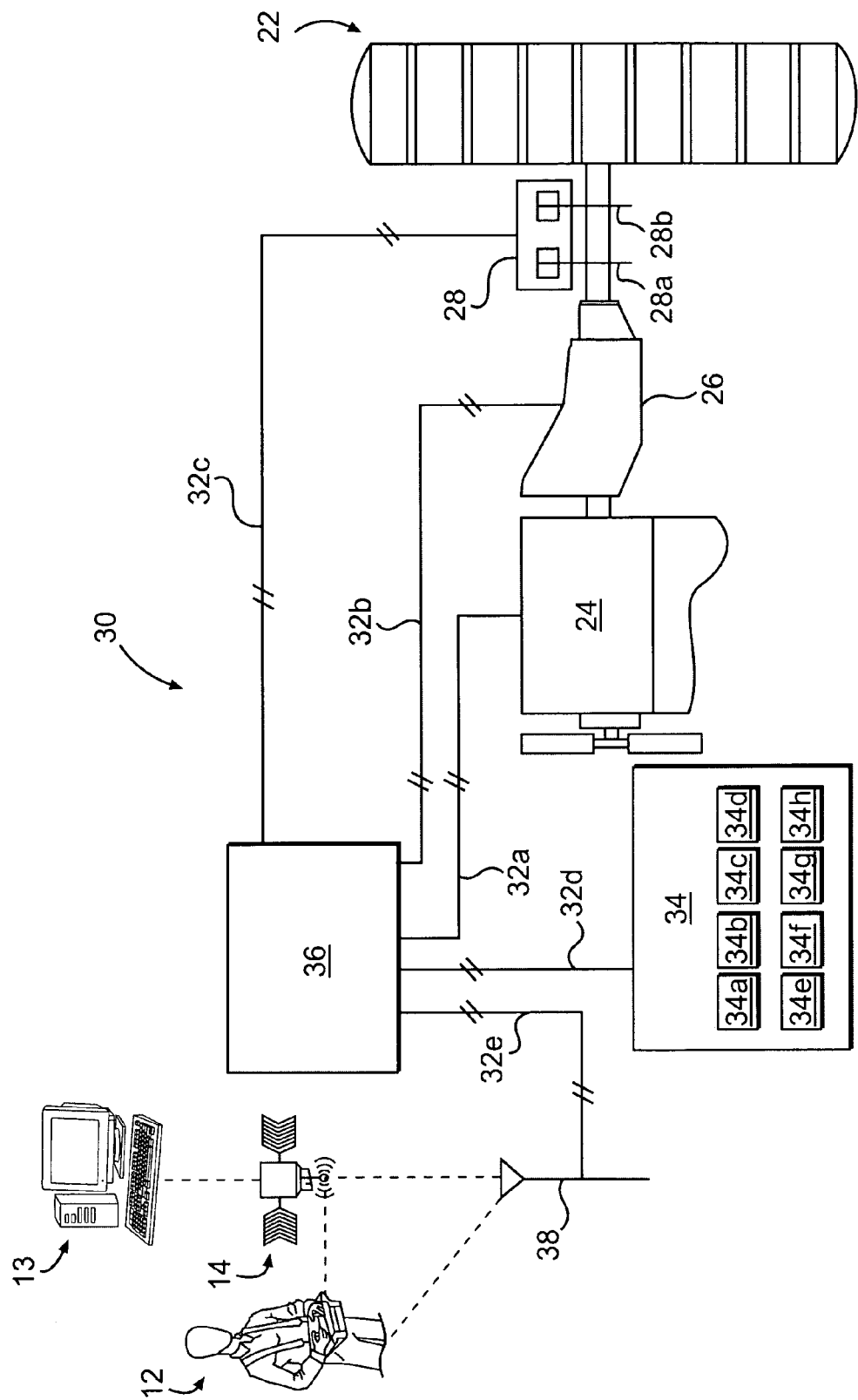
FIG. 2 is a diagrammatic illustration of an exemplary disclosed control system that may be used with the machine of FIG. 1.

As illustrated in FIG. 2, machine 16 may be provided with a power source 24, a driver 26 for driving traction devices 22 (only one shown), a brake 28 for braking traction devices 22, and a control system 30, which includes various components that interact to affect operation of machine 16 in response to commands received from remote operator 12 and/or satellite 14. Control system 30 may include antenna 38 to communicate with the handheld device controlled by remote operator 12 and/or a remote computing system 13, via satellite 14. Control system 30 may also include a data module 34 and a controller 36. Controller 36 may be communicatively coupled to power source 24, driver 26, brake 28, data module 34, and antenna 38 via communication links 32a, 32b, 32c, 32d, and 32e, respectively.

Power source 24 may include an engine, such as, for example, a diesel engine, a gasoline engine, a gaseous fuel powered engine such as a natural gas engine, or any other type of engine apparent to one skilled in the art. Power source 24 may alternatively include a non-combustion source of power such as a fuel cell, a power storage device, an electric motor, or other similar mechanism. Power source 24 may be connected to propel driver 26 via a direct mechanical coupling (e.g., transmission), an electric circuit, a hydraulic circuit, or in any other suitable manner.

Driver 26 may include a transmission, such as a mechanical transmission having three forward gears, three reverse gears, and a neutral condition. In an alternative embodiment, driver 26 may include a motor and a pump, such as a variable or fixed displacement hydraulic pump drivably connected to power source 24. In yet another embodiment, driver 26 may embody a generator configured to produce an electrical current used to drive traction devices 22 by way of an electrical motor, or any other device for driving traction devices 22.

Brake 28 may include any combination of braking mechanisms configured to slow or stop a rotation of traction devices 22. Brake 28 may include both a service brake 28a and a parking brake 28b. Service brake 28a and parking brake 28b may be any type of retarding mechanisms suitable for retarding the rotation of traction devices 22. In one embodiment, service brake 28a and parking brake 28b may include hydraulically-released, spring-applied, multiple wet-disc brakes. However, service brake 28a and parking brake 28b may include any other type of brakes known in the art, such as air brakes, drum brakes, electromagnetic brakes, or regenerative brakes. Service brake 28a and parking brake 28b may also be incorporated into a mechanism of driver 26. In one embodiment, service brake 28a and parking brake 28b may be manually-actuated by levers or pedals disposed in an operator cab of machine 16. Service brake 28a and parking brake 28b may also be actuated by remote operator 12 and/or remote computing system 13, via controller 36.

Data module 34 may include a plurality of sensing devices 34a-h distributed throughout machine 16 to gather real-time data from various components and systems thereof concerning various operational aspects thereof, and communicate corresponding signals to controller 36. For example, sensing devices 34a-h may be used to gather information concerning operation of power source 24 (e.g., speed, torque, etc.), driver 26 (e.g., gear ratio, etc.), brake 28 (e.g., actuation, temperature, etc.), and/or traction devices 22. (e.g., rotational speed, etc.) Sensing devices 34a-h may also be used to gather real-time data regarding machine positioning, heading, speed, acceleration, and/or loading. Sensing devices 34a-h may also be used to gather real-time data concerning worksite 10, such as, for example, a geometry of the worksite terrain. It is to be appreciated that data module 34 may include additional sensors to gather real-time data concerning any other machine and/or worksite operational parameters known in the art, if desired.

In one embodiment, a position locating device 34a may gather real-time data concerning the machine position, machine heading, and/or ground speed information. For example, position locating device 34a may embody a global positioning system (GPS) comprising one or more GPS antennae disposed at one or more locations about machine 16 (e.g., at the front and rear of machine 16). The GPS antenna may receive and analyze high-frequency, low-power electromagnetic signals from one or more global positioning satellites. Based on the trajectories of the one or more signals, and/or information contained therein, position locating device 34a may determine a location of itself relative to the satellites, and thus, a 3-D global position and orientation of machine 16 may be determined by way of triangulation. Signals indicative of this position may then be communicated from position locating device 34a to controller 36 via communication link 32d. Alternatively, position locating device 34a may embody an Inertial Reference Unit (IRU), a component of a local tracking system, or any other known locating device that receives or determines positional information associated with machine 16.

By repeatedly sampling known machine positions, a real-time machine ground speed may be determined based on distances between samples and time indices associated therewith, and/or a time between samples. Alternatively, ground speed may be determined by one or more dedicated ground speed sensing devices 34b. Ground speed sensing devices 34b may include any suitable type of optical or inertial sensor capable of detecting a real-time ground speed of machine 16. Signals indicative of the determined machine ground speed may be communicated by ground speed sensing devices 34b to controller 36 via communication link 32d.

In a further aspect, one or more rotational speed sensing devices 34c may gather data to determine a real-time track speed for each of the traction devices 22. Rotational speed sensing devices 34c may include any suitable type of optical, magnetic, or mechanical sensor capable of determining a real-time track speed for each of the traction devices 22. In one embodiment, rotational speed sensing devices 34c may include proximity sensors disposed in communication with sprockets of the traction devices 22. In another embodiment, rotational speed sensing devices 34c may be associated with an output drive speed or other transmission speed associated with machine 16. Signals indicative of the determined machine track speed may be communicated by rotational speed sensing devices 34c to controller 36 via communication link 32d. Alternatively, controller 36 may receive data indicative of current machine rotational speed, or track speed, from another sensing device or mechanism associated with driver 26.

In a further aspect, one or more inclination sensing devices 34d may gather data to determine a real-time inclination of machine 16 on the surface of worksite 10. For example, inclination sensing devices 34d may include three (or more) GPS antennae receivers disposed about machine 16 in known locations, and an inclination of machine 16 may be determined by comparing an orientation of a surface defined by the respective positions of the three (or more) receivers relative to a gravity vector. Further, a real-time machine inclination heading may be determined by comparing known locations of each of the receivers on machine 16 with determined global positions thereof. Alternatively or additionally, inclination sensing devices 34d may include conventional inclination electronics disposed about machine 16. Inclination sensing devices 34d may further include an accelerometer configured to measure a real-time rate of machine inclination. In one example, a real-time inclination and/or inclination rate of machine 16 may be determined in both a travel direction (pitch), and a direction substantially transverse (e.g., perpendicular) to the travel direction (roll). It is to be appreciated that other inclination sensors known in the art may be used alternatively or additionally. Signals indicative of the determined machine inclination may be communicated from inclination sensing devices 34d to controller 36 via communication link 32d.

Data module 34 may also include one or more load sensing devices 34e to gather real-time loading information about machine 16. In one embodiment, load sensing devices 34e may comprise a plurality of strain gauges or pressure gauges disposed about machine 16 to detect load distribution throughout machine 16. For example, load sensing devices 34e may include four strain gauges, each associated with a suspension point at which traction devices 22 engage an undercarriage of machine 16. In one aspect, load sensing devices 34e may each measure a load magnitude (e.g., a mass, weight, and/or force) applied at the respective suspension points in a direction substantially orthogonal to a machine inclination surface. Additionally, load sensing devices 34e may each measure a load magnitude and direction applied at the respective suspension points in directions substantially parallel to the machine inclination surface. Alternatively or additionally, load sensing devices 34e may measure a load magnitude applied to each of the suspension points along a gravity vector direction. Signals indicative of machine loading may be communicated from load sensing devices 34e to controller 36 via communication link 32d. It is to be appreciated that the measured loads may reflect a portion of the mass of machine 16 itself, as well as any material contained therein. It is to be appreciated that load sensing devices 34e may alternatively or additionally be provided in other locations about machine 16, if desired. Other methods of load sensing known in the art may be used alternatively or additionally.

In a further aspect, one or more transmission sensing devices 34f may be configured to determine one or more operating conditions of a transmission associated with machine 16. In one embodiment, transmission sensing devices 34f may be configured to detect an operating condition of driver 26. For example, transmission sensing devices 34f may determine whether driver 26 is "in-gear" or "out-of-gear" (i.e., in a neutral condition). Transmission sensing devices 34f may also be configured to determine an actual gear condition of machine 16. That is, transmission sensing devices 34f may generate a signal indicative of the current gear in which machine 16 is operating. Alternatively, or additionally, transmission sensing devices 34f may determine a desired gear condition of machine 16. That is, transmission sensing devices 34f may generate a signal indicative of the gear in which an operator has recently instructed machine 16 to operate. For example, transmission sensing devices 34f may generate a signal indicative of a gear or shift lever position. Signals indicative of actual and/or desired gear conditions may be communicated from transmission sensing devices 34f to controller 36 via communication link 32d.

In a further aspect, one or more engine sensing devices 34g may be configured to determine one or more operating conditions of power source 24. For example, engine sensing devices 34g may be configured to determine a real-time engine speed of power source 24. In one embodiment, engine sensing devices 34g may be configured to determine whether power source 24 is "idling." Alternatively, or additionally, engine sensing devices 34g may be configured to determine an engine block temperature, an oil temperature, an oil pressure, or any other parameter indicative of an operating condition of power source 24. Signals indicative of the operating conditions may be communicated from engine sensing devices 34g to controller 36 via communication link 32d.

In a further aspect, one or more brake sensing devices 34h may be configured to determine one or more operating conditions of brake 28. For example, brake sensing devices 34h may be configured to determine when, and to what extent, service brake 28a and parking brake 28b are being actuated. Brake sensing devices 34h may also be configured to determine when, and to what extent, an operator has depressed switches, levers, and/or pedals corresponding to desired actuation of service brake 28a and parking brake 28b. In one embodiment, brake sensing devices 34h may include proximity sensors disposed in communication with service brake 28a and parking brake 28b. In yet another embodiment, brake sensing devices 34h may be configured to determine temperatures associated with service brake 28a and parking brake 28b. Signals indicative of these braking conditions may be communicated from brake sensing devices 34h to controller 36 via communication link 32d.

Sensing devices 34a-h may be configured to gather machine data over time as machine 16 moves about worksite 10. Specifically, the real-time information gathered by sensing devices 34a-h may be stored and tracked in matrix form within the memory of controller 36 and used to generate and continuously update a machine operation history. In one aspect, the history may include a plurality of time-indexed machine operation samples. For example, each sample may include coordinates defining a global position of machine 16 with respect to worksite 10, a travel direction of machine 16 at the position (e.g., heading), and/or an inclination of machine 16 at the position (e.g., a pitch angle and a roll angle with respect to the horizon). Each sample may further include time-indexed data defining the historical operation of power source 24, driver 26, brake 28, and/or traction devices 22. In one aspect, the real-time information gathered by data module 34 may be used to provide a model of the operation of machine 16 on worksite 10 for automated control of machine 16.

Remote computing system 13 may embody, for example, a machine simulator, a mainframe, a work station, a laptop, a desktop, a personal digital assistant, or any other computing system known in the art. Remote computing system 13 may include input devices, such as, for example, keyboards, keypads, touch-screen monitors, touch pads, buttons, joysticks, levers, and/or any other such devices for receiving input commands from a remote operator. Remote computing system 13 may also include components such as, for example, a memory, one or more secondary data storage devices, microprocessors, or any other components used to run an application.

Controller 36 may include devices for monitoring, recording, storing, indexing, processing, and/or communicating machine data to facilitate remote and/or autonomous control of the machine 16. These devices may include, for example, a memory, one or more data storage devices, a central processing unit (e.g., microprocessor), or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Controller 36 may be configured to communicate with one or more of remote operator 12, remote computing system 13, and/or satellite 14 via antenna 38, and/or other hardware and/or software that enables transmitting and receiving data through a direct data link (not shown) or a wireless communication link. The wireless communications may include satellite, cellular, infrared, radio, microwave, or any other type of wireless electromagnetic communications that enable controller 36 to exchange information. In one aspect, controller 36 may communicate the data to satellite 14, which may then relay the communications directly to the remote computing system 13. Alternatively, the data may be communicated by satellite 14 to an intermediary, such as a server (not shown), which may appropriately package the data for transmission to remote computing system 13. Similarly, remote computing system 13 may communicate operator input commands to satellite 14, which may relay the communications to controller 36 for remote operator control of machine 16. As will be appreciated by one of skill in the art, each of remote operator 12, remote computing system 13, and satellite 14 may be interconnected by any type of wireless network, such as a wide area network (WAN) connected to the Internet.

In one embodiment, controller 36 may automatically affect machine movement and/or other machine functions in response to the received operator input commands. Additionally, controller 36 may implement an automated machine retarding algorithm, which will be further discussed below. Controller 36 may communicate with power source 24, driver 26, brake 28, various hydraulic control valves associated with cylinders 20, transmission devices, and any other actuation components of machine 16 to initiate, modify, or halt operation of traction devices 22, as necessary or desired. For example, controller 36 may responsively vary electrical currents and/or voltage levels, fluid and/or gas pressure, and/or pump displacement to control a torque-to-speed output ratio of driver 26 or otherwise vary an output speed, direction, steering angle of traction devices 22, and/or an extension length of cylinders 20. Controller 36 may also responsively vary actuation of service brake 28a and/or parking brake 28b.

In one embodiment, controller 36 may be configured to initiate an automated machine retarding operation in response to signals received from data module 34. Specifically, upon receiving signals from devices 34a-h indicating an undesirable engine or machine condition for a given machine operation sample, controller 36 may be configured to communicate signals to driver 26 (discussed above) and/or brake 28 to retard traction devices 22. Controller 36 may be configured to apply service brake 28a and/or parking brake 28b, as well as power down machine 16, if desired. It is to be appreciated that any additional machine functions known in the art may similarly be controlled, if desired These features will be discussed further in the following section with reference to FIGS. 3 and 4 to illustrate functionality of the disclosed control system.

INDUSTRIAL APPLICABILITY

The disclosed control system may be applicable to any machine operating on sloping terrain. In general, the disclosed control system may determine the likelihood and extent of an undesirable engine and/or machine operating condition and determine one or more braking commands for retarding the machine by an amount sufficient to mitigate the undesirable operating conditions. Alternatively, the control system may determine one or more braking commands for preemptively retarding the machine in response to anticipated undesirable operating conditions. Although equally applicable to manually, remotely, and autonomously controlled machines, control system 30 will now be described below with respect to a remotely-controlled machine 16.

Figure 3:
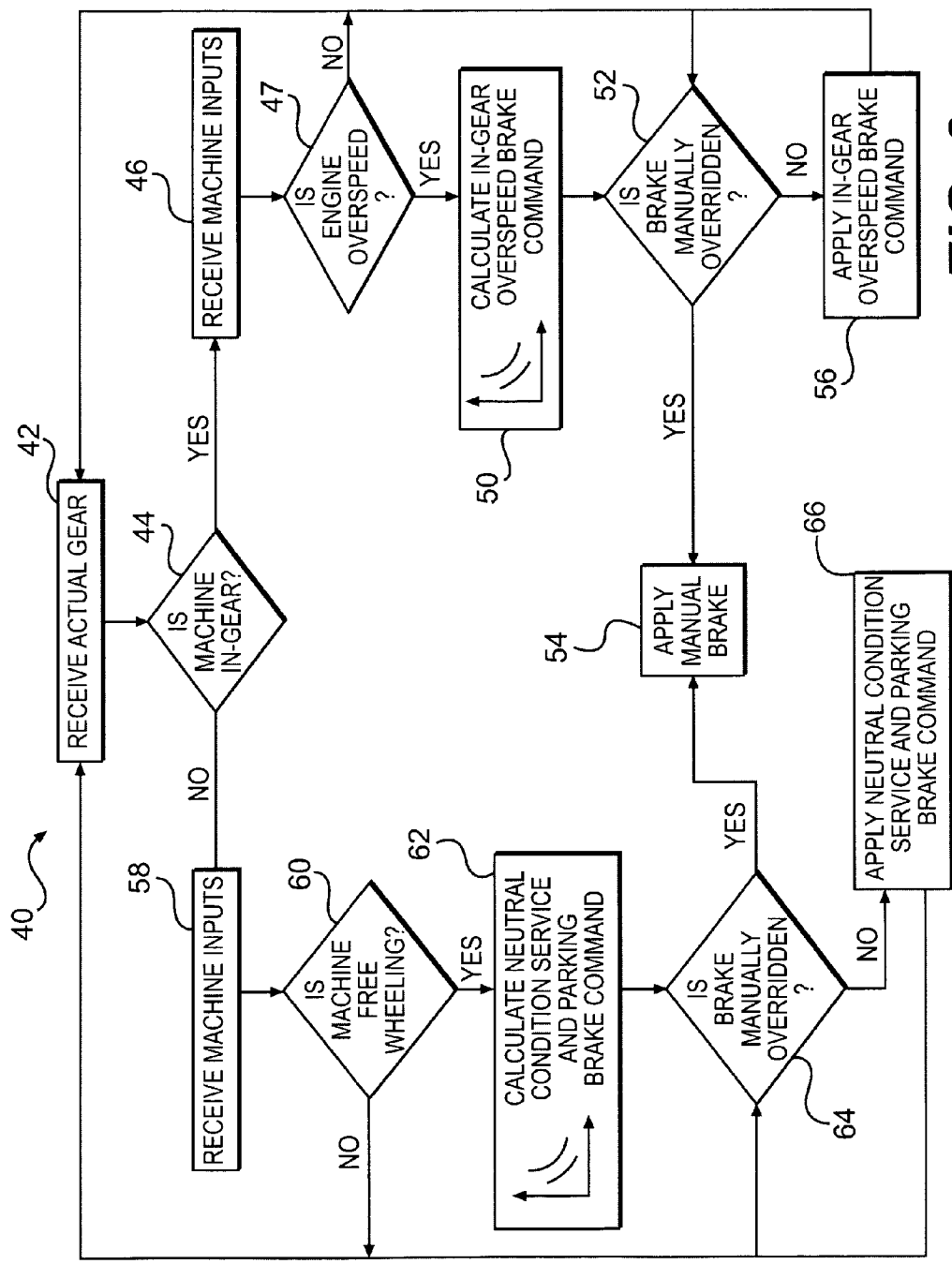
FIG. 3 is a flow chart illustrating an exemplary disclosed method of operating the control system of FIG. 2.

As shown in FIG. 3, control system 30 may implement a machine retarding algorithm 40, while machine 16 is remotely controlled by one or more of remote operator 12 and remote computing system 13, via satellite 14. Controller 36 may implement machine retarding algorithm 40 based on machine position, heading, inclination, loading, operation, and/or known machine specifications.

As represented in FIG. 3, as machine 16 is operated about worksite 10, controller 36 may receive an actual gear condition of machine 16, and determine when driver 26 is "in-gear" (step 42). For example, controller 36 may receive a signal indicative of an actual gear condition of driver 26 from one of transmission sensing devices 34f.

When machine 16 is in-gear (i.e., not in a neutral condition), controller 36 may implement an in-gear portion of machine retarding algorithm 40. Specifically, controller 36 may receive machine inputs, including a current engine speed of power source 24 from engine sensing devices 34g (step 46). For purposes of comparison, a maximum threshold engine speed may be stored in the memory of controller 36. The maximum engine speed may be an engine speed above which damage may occur to the power source 24 and/or hydraulic components of machine 16. In one embodiment, the maximum engine speed may be in the range of about 2000-2500 RPM. Controller 36 may compare the received real-time engine speed of power source 24 to the maximum engine speed (step 47). If the real-time engine speed is less than the maximum engine speed, the process flow may return in a closed-loop to the logical initial step of determining whether the machine is in-gear (step 44). Controller 36 may cycle through the initial step approximately 100 times per second.

When controller 36 determines that the real-time engine speed is higher than the maximum engine speed, controller 36 may calculate an in-gear overspeed brake command (step 50). In order to calculate the in-gear overspeed brake command, controller 36 may employ proportional-integral-derivative (PID) control methods. In general, the in-gear overspeed brake command at any given time, t, may be a manipulated brake variable (MBV) defined according to Eq. 1 below:

$$MBV(t) = P_{out} + I_{out} + D_{out} \qquad \text{Eq. 1:}$$

wherein:
$P_{out}$ is a proportional output;
$I_{out}$ is an integral output; and,
$D_{out}$ is a derivative output.

$P_{out}$ may be a function of the difference between the current engine speed and the maximum engine speed. Specifically, $P_{out}$ may be defined according to Eq. 2 below:

$$P_{out} = K_p \times e(t) \qquad \text{Eq. 2:}$$

wherein:
$K_p$ is a tuned proportional gain parameter between 0 and 1;
e is the difference (error) between the current engine speed and the maximum engine speed; and
t is the instantaneous time of calculation.

$I_{out}$ may be a function of the magnitude of e for a given duration defined by $\pi$. Specifically, $I_{out}$ may be defined according to Eq. 3 below:

$$I_{out} = K_i \times \int_0^\tau e(\tau) d\tau \qquad \text{Eq. 3}$$

wherein:
$K_i$ is a tuned integral gain parameter between 0 and 1;
e is the difference (error) between the current engine speed and the maximum engine speed; and
$\tau$ is the selected interval of time contributing to the integral output.

$D_{out}$ may be a function of the rate of change of the difference between the real-time engine speed and the maximum engine speed. Specifically, $D_{out}$ may be defined according to Eq. 4 below:

$$D_{out} = K_d \times de/dt \qquad \text{Eq. 4:}$$

wherein:
$K_d$ is a tuned derivative gain parameter between 0 and 1;
e is the difference (error) between the current engine speed and the maximum engine speed; and
t is the instantaneous time of calculation.

Accordingly, controller 36 may calculate an in-gear overspeed brake command that is based not only on the instantaneous difference between the real-time engine speed and the maximum engine speed, but also on the history of any such difference, and the rate at which it is changing. The in-gear overspeed brake command may also be calculated as a function of values stored in a plurality of look-up tables, based on known relationships between predetermined braking functions and their result on engine speeds. Based on these parameters, the above-referenced equations, and one or more look-up table values, controller 36 may prepare an in-gear overspeed service brake command (step 50).

However, as a preliminary step to implementing the in-gear overspeed service brake command, controller 36 may determine whether control of any of brake 28 has been overridden (i.e., by remote operator 12 or otherwise) (step 52). If control of brake 28 has been overridden, brake 28 may be applied manually, as instructed by an operator (step 54). However, if control of brake 28 has not been manually overridden, the in-gear overspeed brake command may be applied automatically (step 56). Specifically, the in-gear overspeed brake command may be directed to brake 28, and more specifically, to service brake 28a. For example, the in-gear overspeed brake command may modulate service brake 28a based on PID calculations performed by controller 36, so as to reduce the engine speed to a value below the maximum engine speed. In one embodiment, the service brake 28a may be modulated (i.e., pulsed on and off) so as to sufficiently reduce the engine speed without causing sudden or damaging braking maneuvers. In some embodiments, the in-gear overspeed braking command may be implemented to help inhibit driver 26 from affecting a rotation of power source 24 as a result of downhill travel and rotation of traction devices 22. Specifically, service brake 28a may be modulated so as to retard traction devices 22 by an amount sufficient to inhibit them from undesirably raising the engine speed of power source 24. It will be appreciated that in some embodiments, the in-gear overspeed brake command may also be calculated based on one or more of the instantaneous or recorded machine ground speed, rotational speed, inclination, and load conditions. Accordingly, whenever machine 16 is in-gear, controller 36 may mitigate the likelihood of operating power source 24 at undesirably high speeds.

If controller 36 determines that machine 16 is out-of-gear (i.e., in a neutral condition), controller 36 may implement a neutral retarding portion of algorithm 40. Specifically, controller 36 may receive machine inputs from one or more of devices 34a-h. For example, controller 36 may receive real-time signals indicating one or more of a current position, ground speed, rotational speed, inclination, loading condition, transmission condition, engine condition, and/or braking condition of machine 16 (step 58).

In response to signals received from devices 34a-h, controller 36 may determine when machine 16 is undesirably freewheeling, or otherwise moving without input from power source 24 and/or driver 26 (step 60). In general, controller 36 may be configured such that a braking command is implemented when remote operator 12 has unintentionally neglected to set parking brake 28b. However, controller 36 may also be configured to avoid braking when machine 16 has been set in a neutral condition, but only as an intermediate step to an ongoing operating task. For example, when remote operator 12 places machine 16 in a neutral condition when switching between a forward gear and a reverse gear, controller 36 may advantageously avoid setting parking brake 28b.

When determining when machine 16 has been left unattended, controller 36 may take into account the amount of time that has passed since machine 16 was in-gear. In one embodiment, controller 36 may employ a counter for determining how long machine 16 has been left unattended in a neutral condition. Controller 36 may perform repeated comparisons between this time interval and a predetermined neutral condition time threshold. In general, as more time passes since machine 16 has been in-gear, it will be more likely that machine 16 has been unattended in the neutral condition. Controller 36 may also receive an engine speed to determine whether machine 16 has been "idling" in neutral for a certain amount of time.

In order to determine whether machine 16 is freewheeling in such a neutral condition, controller 36 may also take into account one or more of the inclination, loading, ground speed, and rotational speed of machine 16. For example, higher values of inclination and loading may lower the threshold at which controller 36 determines that machine 16 is unattended. Similarly, larger acceleration values associated with detected ground speed and/or rotational speed may lower the threshold at which controller 36 determines the machine is experiencing slope-induced freewheeling. In one embodiment, controller 36 may determine that machine 16 is experiencing freewheeling if there is any ground or rotational speed after it has remained in neutral for a given time interval, regardless of other factors such as inclination and loading.

If controller 36 determines that machine 16 is not experiencing freewheeling, the process flow may return in a closed-loop to the logical initial step of determining whether the machine is in-gear (step 44). Again, it will be appreciated that controller 36 may cycle through the initial step approximately 100 times per second.

If controller 36 determines that machine 16 is in fact, freewheeling, controller 36 may calculate a neutral condition service and parking brake command (step 62). In order to calculate the neutral condition service and parking brake command, controller 36 may employ PID control methods as described above with respect to the in-gear portion of algorithm 40. However, in the case of the neutral condition portion of algorithm 40, controller 36 may have determined that machine 16 is freewheeling, without being under the control of either remote operator 12 and/or remote computing system 13, or despite such control. Accordingly, in such circumstances, the PID error, e, may be defined by the difference between the current ground speed and a ground speed equal to zero. That is, when controller 36 determines that machine 16 is freewheeling in a neutral gear, controller 36 may advantageously act to halt machine 16. Thus, based on these parameters, the above-referenced PID equations, and one or more look-up table values, controller 36 may prepare a neutral condition service and parking brake command (step 62).

However, as discussed above with respect to the in-gear portion of algorithm 40, controller 36 may perform a preliminary step of determining whether control of the brake 28 has been overridden by remote operator 12 or otherwise (step 64). If control of brake 28 has been overridden, brake 28 may be applied manually as instructed by an operator (step 54). If control of brake 28 has not been overridden, the neutral condition service and parking brake command may be automatically applied (step 66).

The neutral condition service and parking brake command may be directed to brake 28, and more specifically, to service brake 28a and then parking brake 28b. In one embodiment, the neutral condition service and parking brake command includes modulating service brake 28a until machine 16 has come to a complete stop, and then setting parking brake 28b.

For example, the neutral condition service and parking brake command may instruct modulation of service brake 28a, based on PID calculations performed by controller 36, so as to gradually reduce the ground speed of machine 16 until it reaches about zero. In one embodiment, service brake 28a may be modulated (i.e., pulsed on and off) so as to bring machine 16 to a stop without causing sudden or damaging braking maneuvers. Once sensing devices 34a-h indicate to controller 36 that machine 16 has come to a complete stop (e.g., via ground and/or rotational speed sensing devices 34b, 34c), the neutral condition service and parking brake command may instruct parking brake 28b to be set on traction devices 22. Accordingly, in the event that machine 16 has begun to freewheel in a neutral gear after having been left unattended on a slope in a neutral condition, the neutral condition service and parking brake command may be implemented by controller 36 to bring machine 16 to a controlled stop. In one embodiment, once remote operator 12 discovers that the parking brake 28b of machine 16 has been automatically set by controller 36, remote operator 12 may need to cycle a parking brake switch (not shown) on a remote device by which remote operator 12 controls machine 16. That is, remote operator 12 may need to switch parking brake 28b on, and then off, to interrupt the neutral condition parking brake command and resume control over machine 16.

Figure 4:
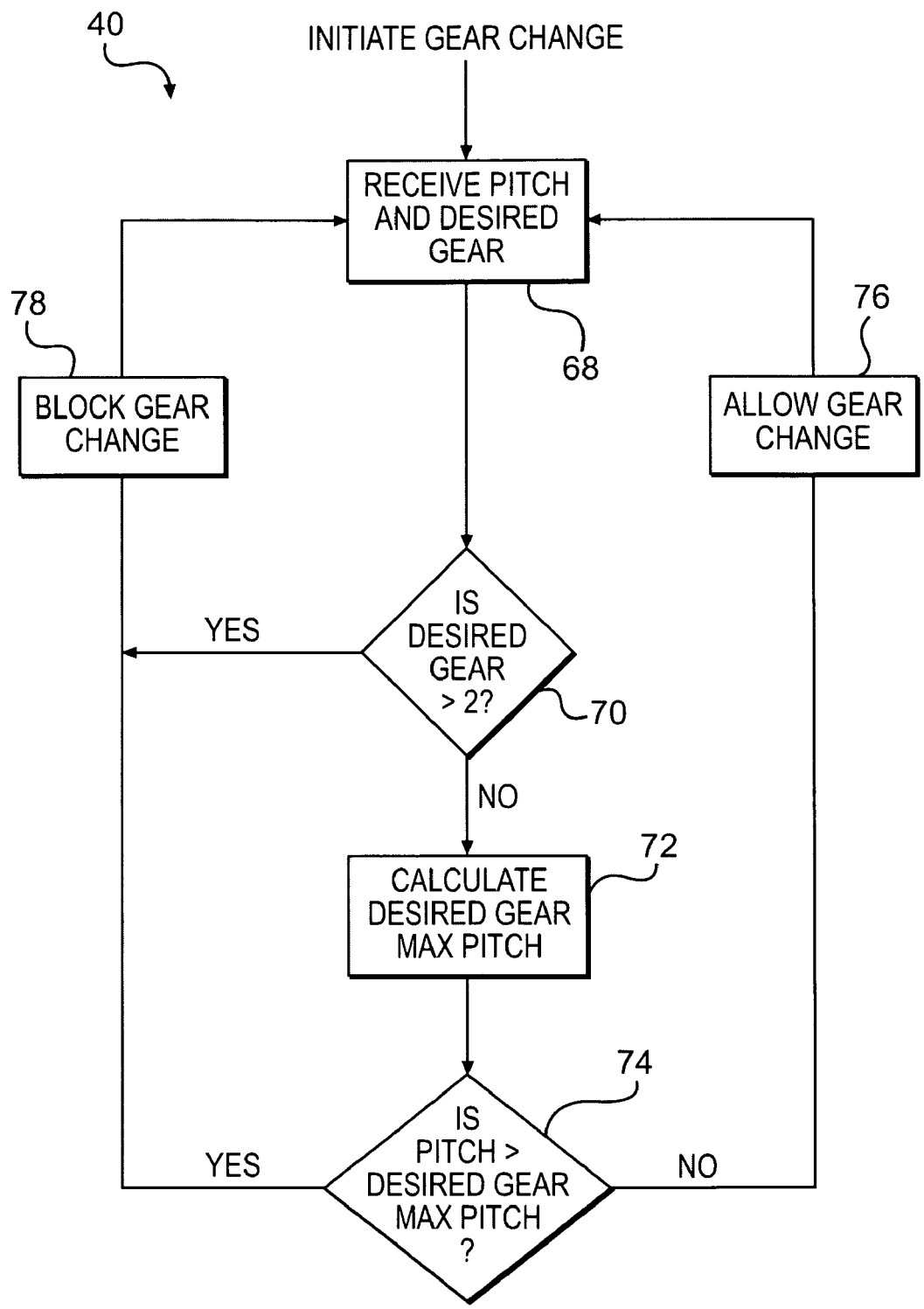
FIG. 4 is a flow chart illustrating another exemplary disclosed method of operating the control system of FIG. 2.

In another aspect, controller 36 may implement a method of gear limiting, as depicted in FIG. 4. Specifically, upon initiation of a desired transmission gear change, either by a remote operator 12, or remote computing system 13 via satellite 14, controller 36 may receive the current machine pitch and desired gear (step 68). For example, controller 36 may determine the current machine inclination or pitch based on signals received from position locating device 34a and/or inclination sensing devices 34d. Controller 36 may determine the desired gear based on signals received from transmission sensing devices 34f. Controller 36 may then determine whether the desired gear is higher than the second forward gear or the second reverse gear (step 70). If the desired gear is higher than the second forward or reverse gears, and therefore potentially conducive to an excessive speed for a remotely or autonomously controlled vehicle, then controller 36 may block the desired gear change (step 78). Thus, controller 36 may prevent gear ratios higher than those in the second forward or reverse gears.

If the desired gear is not higher than the second forward or reverse gears, then controller 36 may calculate the desired gear maximum pitch (step 72). Specifically, controller 36 may determine the maximum pitch suitable for the desired gear ratio. In one embodiment, controller 36 may reference a look-up table, in which maximum pitch values are stored for each gear ratio. In some instances, the maximum pitch for a certain gear may also be a function of the current inclination, loading conditions, ground speed, rotational speed, and/or engine and braking conditions. However, it will be appreciated that the maximum pitch for a desired gear may be a function of any other machine or worksite condition, as desired.

Controller 36 may compare the current pitch to the maximum pitch of the desired gear (step 74). If the current pitch is lower than the maximum pitch of the desired gear, controller 36 may allow the desired gear change (step 76). However, if the current pitch is higher than the maximum pitch of the desired gear, then controller 36 may block the desired gear change (step 78). For example, controller 36 may control driver 26 in a manner contrary to the instructions received from remote operator 12 or remote computing system 13. Accordingly, controller 36 may prevent gear changes which are desired by a remote user, but which controller 36 determines to be detrimental to operation of power source 24 and/or machine 16.

The disclosed machine retarding system and method may compensate for a lack of intuitive feel and sense that a remote operator or autonomous system could have as a result of being physically removed from machine 16. Additionally, if an excessive incline is encountered, remote operator 12 may rely on the disclosed system and method to prevent engine damage or damage to the machine.

It is to be appreciated that the disclosed machine retarding algorithm could be implemented in conjunction with manually and/or autonomously controlled machines, as well as remotely controlled machines. In the case of a manually controlled machine, the algorithm may be implemented in the same manner discussed above, except that the operator may be on-board machine 16. In the case of an autonomously controlled machine where no operator is present, the algorithm may also be implemented as discussed above.

It will be apparent to those skilled in the art that various modifications and variations can be made to the disclosed retarding system. Other embodiments will be apparent to those skilled in the art from consideration of the specification and practice of the disclosed retarding system. It is intended that the specification and examples be considered as exemplary only, with a true scope being indicated by the following claims and their equivalents.

What is claimed is:

1. A control system for a remotely or autonomously controlled machine, comprising:
    a first sensor configured to generate a first signal indicative of an inclination of the remotely or autonomously controlled machine;
    a second sensor configured to generate a second signal indicative of a travel speed of the remotely or autonomously controlled machine;
    a third sensor configured to generate a third signal indicative of an engine speed of the remotely or autonomously controlled machine;
    a controller disposed in communication with each of the first, second, and third sensors,
    a transmission configured to be placed in one of a plurality of gears or a neutral condition; and
    a service brake configured to be modulated by the controller;
    wherein the controller is configured to determine whether the machine is freewheeling in a neutral condition, to generate a neutral condition machine braking command based on at least one of the first, second, and third signals, and to modulate the service brake based on the neutral condition machine braking command, until the machine has come to a stop;
    wherein the controller is further configured to determine whether an engine of the remotely or autonomously controlled machine is operating above a threshold speed, to generate an over-speed machine braking command based on at least one of the first, second, and third signals, and to modulate the service brake based on the over-speed machine braking command, until the engine is operating below the threshold speed;
    wherein the controller is further configured to determine whether the transmission will be placed in a gear that results in a travel speed or an engine speed above a threshold speed, based on at least one of the first, second, and third signals, and to inhibit the transmission from being placed in a gear that results in the travel speed or the engine speed exceeding the threshold speed; and
    wherein the neutral condition machine braking command and over-speed machine braking command are based on a history and a rate of change of one or more of the first, second, and third signals.

2. The control system of claim 1, wherein the controller is further configured to determine an amount of time that the machine has spent in the neutral gear.

3. The control system of claim 1, further including a parking brake configured to be set by the controller based on the neutral condition machine braking command, until the neutral condition machine braking command is manually-overridden.

4. A method of retarding a remotely or autonomously controlled machine comprising:
    detecting an inclination of the remotely or autonomously controlled machine and generating a first signal indicative of the inclination;
    detecting a travel speed of the remotely or autonomously controlled machine and generating a second signal indicative of the travel speed;
    detecting an engine speed of the remotely or autonomously controlled machine and generating a third signal indicative of the engine speed;
    determining whether the machine is freewheeling in a neutral gear, generating a neutral condition machine braking command based on at least one of the first, second, and third signals, and modulating a service brake based on the neutral condition machine braking command, until the machine has come to a stop;
    determining whether an engine of the remotely or autonomously controlled machine is operating above a threshold speed, generating an over-speed machine braking command based on at least one of the first, second, and third signals, and modulating the service brake based on the over-speed machine braking command, until the engine is operating below the threshold speed; and
    determining whether a transmission of the machine will be placed in a gear that results in a travel speed or an engine speed above a threshold speed, based on at least one of the first, second, and third signals, and inhibiting the transmission from being placed in a gear that results in the travel speed or the engine speed exceeding the threshold speed;
    wherein the neutral condition machine braking command and over-speed machine braking command are based on a history and a rate of change of one or more of the first, second, and third signals.

5. The method of claim 4, wherein the step of determining whether the machine is freewheeling in a neutral gear is at least based on an amount of time that the machine has spent in the neutral gear.

6. The method of claim 4, wherein generating the neutral condition machine braking further includes maintaining the machine at a stop by setting a parking brake.

7. The method of claim 4, wherein the service brake is modulated based on PID control methods.

8. A remotely or autonomously controlled machine, comprising:
    a power source;
    a traction device driven by the power source to propel the remotely or autonomously controlled machine;
    a first sensor configured to detect an inclination of the remotely or autonomously controlled machine;
    a second sensor configured to detect a travel speed of the remotely or autonomously controlled machine;
    a third sensor configured to detect an engine speed of the remotely or autonomously controlled machine;
    a controller disposed in communication with each of the first, second, and third sensors,
    a transmission configured to be placed in one of a plurality of gears or a neutral condition; and
    a service brake configured to be modulated by the controller;
    wherein the controller is configured to determine whether the machine is freewheeling in a neutral gear, to generate a neutral condition machine braking command based on at least one of the first, second, and third sensors, and to modulate the service brake based on the neutral condition machine braking command, until the machine has come to a stop;

wherein the controller is further configured to determine whether an engine of the remotely or autonomously controlled machine is operating above a threshold speed, to generate an over-speed machine braking command based on at least one of the first, second, and third sensors, and to modulate the service brake based on the over-speed machine braking command, until the engine is operating below the threshold speed;

wherein the controller is further configured to determine whether the transmission will be placed in a gear that results in a travel speed or an engine speed above a threshold speed, based on at least one of the first, second, and third sensors, and to inhibit the transmission from being placed in a gear that results in the travel speed or the engine speed exceeding the threshold speed; and wherein the neutral condition machine braking command and over-speed machine braking command are based on a history and a rate of change of one or more of the first, second, and third sensors.

9. The machine of claim 8, wherein the service brake is modulated based on PID control methods.

10. The machine of claim 9, further including a parking brake configured to be set by the controller based on the neutral condition machine braking command, until the neutral condition machine braking command is manually-overridden.

* * * * *